Oct. 15, 1968    F. J. ADAMS    3,405,735
SPOOL VALVE WITH ADJUSTABLE SPRING LOADING
Filed Sept. 9, 1966
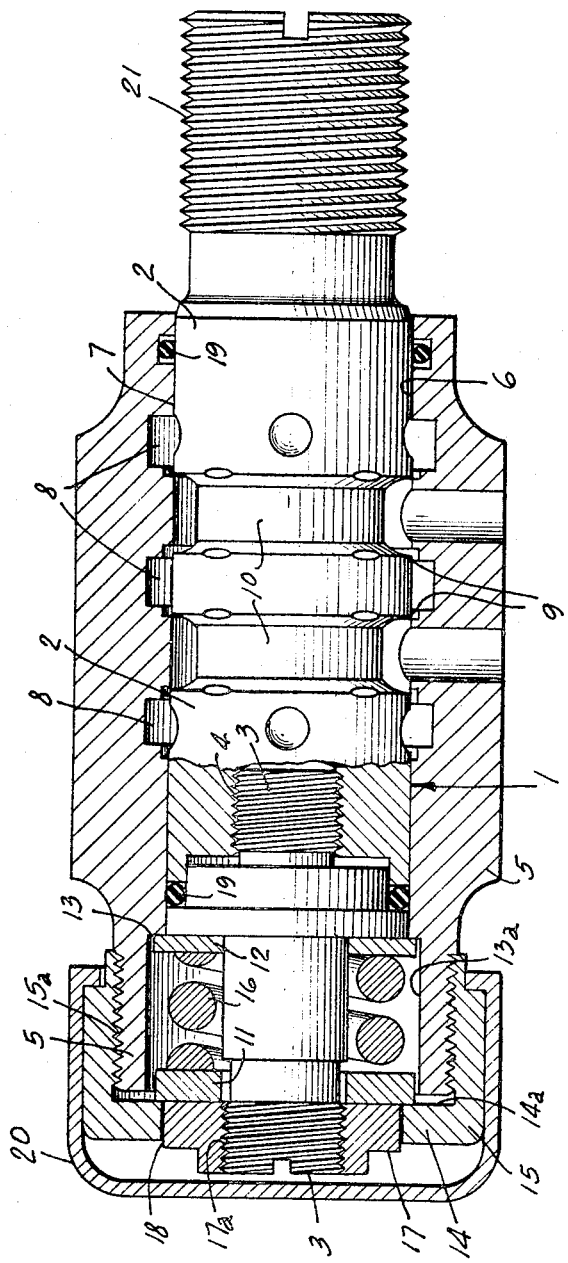
INVENTOR.
FREDERICK J. ADAMS
BY *Hill, Sherman, Meroni, Gross & Simpson*    ATTORNEYS

United States Patent Office 3,405,735
Patented Oct. 15, 1968

3,405,735
SPOOL VALVE WITH ADJUSTABLE
SPRING LOADING
Frederick John Adams, Campton, England, assignor to
Cam Gears (Luton) Limited, a British company
Filed Sept. 9, 1966, Ser. No. 578,253
Claims priority, application Great Britain, Sept. 10, 1965,
38,700/65
1 Claim. (Cl. 137—625.69)

ABSTRACT OF THE DISCLOSURE

A spool valve with an axially shiftable spool that is spring-loaded against axial movement from a central neutral position. The spring load is adjustable by varying the compression on the spring and an adjustable cap is provided to bottom the preloading means for the spring. The spool may be provided with an adjustable extension to control the position of the spool relative to the ports in the housing.

---

This invention relates to valves and in particular to spool valves.

It has previously been proposed to provide a spool valve in which axial movement of the spool relative to its housing in either sense of axial direction is damped sufficiently to provide progressive resistance to such displacement of the spool relative to its housing. The axial displacement of the spool relative to its housing is damped by the action of spring means.

It is desirable that the progressive resistance afforded by the spring means can be adjusted as required to provide a desired preload of the spring means suitable for a particular application of the spool valve and it is an object of the present invention to provide means for adjusting the progressive resistance afforded by the spring means.

According to the present invention there is provided a spool valve in which axial movement of the spool relative to its housing is damped by the action of spring means which serve to provide progressive resistance to displacement of the spool in its housing, wherein means is provided for adjusting the progressive resistance afforded by the spring means and includes a locking member adjustable on and relative to the spool, to adjust preload of the spring means and an abutment member adjustable on and relative to the housing to accommodate any such adjustment of the locking member, the arrangement being such that axial displacement of the spool relative to its housing, in one sense of direction, causes the spring means to be energised between the locking member and the housing and, in the reverse sense of direction, causes the spring means to be energised between the abutment member and the spool.

The term "spring means" includes high rate disc springs, Belleville washers, spiral springs and the like.

One embodiment of the present invention will now be described by way of example only and with reference to the accompanying diagrammatic drawing which illustrates, in part cross-section, a spool valve constructed according to the present invention.

The spool valve illustrated includes a spool housing 5 and a spool assembly shown generally at 1 which assembly comprises a spool 2 and a coaxial spool extension 3 of relatively reduced diameter linearly and axially connected thereto by a screw thread 4 so that their combined axial length can be adjusted by rotating them relatively to each other. The spool assembly 1 is axially slidably located in the spool housing 5 so that an internal arcuate face 6 of the spool housing is in sealing abutment with an external cylindrical face 7 of the spool 2. The spool housing 5 is provided on its internal face 6 with three annular grooves 8 the openings to which grooves are controlled by edges 9 of two peripheral grooves 10 in the spool 2. The arrangement of the grooves in the spool 2 and in the spool housing 5 and the associated fluid circuitry are well known in the art of spool valves and as such are not described herein.

The spool extension 3 is provided with two encircling, axially spaced, thrust washers 11 and 12 which are slidable thereon in an axial direction relative to the spool housing 5 and are located between a shoulder 13 of an annular rebate 13a provided in the internal face 6 of the spool housing and the face 14a of an abutment member in the form of a flange 14 of an abutment nut 15. The abutment nut 15 is provided with an internal screw thread for engagement at 15a with a complementary external screw thread provided on the spool housing 5. It will be apparent that the abutment nut 15 is adjustable on and relative to the housing 5 so that the axial distance between the face 14a of the abutment nut 15 and the shoulder 13 of the housing 5 can be adjusted as desired.

Located between the thrust washers 11 and 12 so as to encircle the spool extension 3 is a spiral spring 16 which spring is retained between the thrust washers 11 and 12 by a locking member in the form of an internally screw threaded locking nut 17 engaging at 17a with a complementary external screw thread provided on the spool extension 3. The abutment nut 15 is provided with an aperture 18 so that the locking nut 17 can pass therethrough during axial movement of the spool assembly 1 relative to the spool housing 5 and the abutment nut 15.

The spool valve is provided with two O-ring fluid seals 19 located between the spool assembly 1 and the spool housing and a removably attached protective cover 20.

The operation of the spool valve above described will now be considered. The spool assembly 1 is attached to a control unit (not shown) through a connecting link 21 so that controlled axial linear movement can be imparted to the spool assembly 1 in either sense of axial direction relative to the spool housing 5 and the abutment nut 15.

The preload of the spiral spring 16 is adjusted by removing the protective cover 20 and screwing the locking nut 17 relative to the spool extension 3 to increase or decrease the axial distance between the thrust washers 11 and 12 thereby adjusting compression of the spring 16. If the compressive load of the spring 16 is to be increased, the abutment nut 15 is screwed relative to the housing 5 to decrease the axial distance between the shoulder 13 and the face 14a, and the locking nut 17 is screwed relative to the spool extension 3 until it abuts the thrust washer 11 to accommodate the adjustment in preload. If the compressive load of the spring 16 is to be decreased then, preferably, the abutment nut 15 is unscrewed relative to the housing 5 and the locking nut 17 unscrewed relative to the spool extension 3 to increase the axial distance between the shoulder 13 and the face 14a until the desired preload on the spring 16 is attained; the abutment nut 15 is now screwed along the housing 5 until it again abuts the thrust washer 11 thereby accommodating the adjustment in preload.

When the spool assembly 1 is moved rightwardly relative to the spool housing 5 under the action of a controlling force from the control unit, the thrust washer 12 abuts the shoulder 13 of rebate 13a and the continued rightward movement of the thrust washer 11 and the locking nut 17 causes the spring 16 to be compressed and thereby energised to provide the progressive resistance to axial movement of the spool assembly. Removal of the controlling force causes the energised spring 16 to return the spool assembly 1 to its original position.

Conversely, if the spool assembly 1 is moved leftwardly relative to the spool housing 5 under a controlling force from the control unit, the thrust washer 11 abuts the face 14a of flange 14 on the abutment nut 15 and the spring 16 is compressed by the continued leftward movement of the thrust washer 12 to provide the progressive resistance to axial movement of the spool assembly 1. Removal of the controlling force causes the energised spring 16 to return the spool assembly to its original position.

It will be apparent that for any desired adjustment of pre-load of the spring 16, the spool assembly 1 is biased to a constant position by the spring 16 and consequently the relative positioning between the grooves 8 and 10 remains constant. It is often desirable to alter the relative positioning between the grooves 8 and 10, i.e., to change the position to which the spool 2 is biased by the spring 16. Consequently the spool 2 and extension 3 are axially connected by the screw thread 4 so that their combined axial length can be adjusted thereby providing means whereby the biased position of the spool 2 can be adjusted relative to the housing independent of any adjustment made in preload of the spring 16.

Preferably the screw threaded connections 4 and 17a are provided with self-locking thread inserts as illustrated.

It will be realised that several modifications are possible to the spool valve as above described without departing from the spirit of the present invention, for example, the spool and spool extension can be an integral complete unit as is well known in spool valves, the thrust washers 11 and 12 can be omitted provided that the spiral spring 16 is of an external diameter sufficient to abut against the face 14a of flange 14 and the shoulder 13 of the housing 5.

What I claim is:

1. A spool valve which comprises a spool housing having control ports therein, a spool axially slidable in the spool housing and having control ports cooperating with said control ports in the housing, means in the housing effective to dampen axial displacement of the spool in the housing from a neutral position, means for selectively preloading and dampening means including a first adjusting means for changing the axial dampening load on the spool and a second adjusting means for selectively bottoming said first adjusting means whereby a desired dampening preload on the spool may be selected without varying the neutral position of the spool, and means between paid preloading means and the spool for adjusting the position of the spool ports relative to the housing ports.

References Cited
UNITED STATES PATENTS 2,783,745   3/1957   Stephens _____ 137—625.69

ARNOLD ROSENTHAL, *Primary Examiner.*